United States Patent [19]
Munir et al.

[11] Patent Number: 5,380,409
[45] Date of Patent: Jan. 10, 1995

[54] FIELD-ASSISTED COMBUSTION SYNTHESIS

[75] Inventors: Zuhair A. R. Munir; Weinong Lai; Karl H. Ewald, all of Davis, Calif.

[73] Assignee: The Regents of the University of California, Oakland, Calif.

[21] Appl. No.: 27,965

[22] Filed: Mar. 8, 1993

[51] Int. Cl.[6] ............................................. C25F 5/00
[52] U.S. Cl. .................................. 204/130; 75/10.1; 264/22; 264/27; 204/59 R
[58] Field of Search .................. 204/130, 59; 431/258; 75/10.1, 10.14; 264/22, 27; 432/1

[56] References Cited

PUBLICATIONS

Knyasik et al., "Macrokinetics of High-Temperature Titanium Interaction with Carbon Under Electrothermal Explosion Conditions", Combust, Explos. Shock Waves, 21: 333 (1985) no month available.
Knyazik, et al., "Mechanism of Combustion in the Titanium-Carbon System", Dokl. Akad. Nauk SSSR, 301:689 (1988) no month available.
Munir, Z. A. "Synthesis of High Temperature Materials by Self-Propagating Combustion Methods", Ceramic bulletin, 67: 342 (1988) no month available.
Muinir, A. Z. and U. Anselmi-Tamburini, "Self-Propagating Exothermic Reactions: The Synthesis of High-Temperature materials by Combustion", Materials Science Reports, 3: 277 (1989) no month available.
Dunmead et al., "Temperature Profile Analysis in Combustion Synthesis: I, Theory and Background", J. Am. Ceram. Soc., 75: 175 (1992) no month available.
Dunmead et al., "Temperature Profile Analysis In Combustion Synthesis: II, Experimental Observations", J. Am. Ceram. Soc., 75: 180 (1992) no month available.
Anselmi-Tamburini, U. and Z. A. Munir, "The Propagation of Solid-State Combustion Waves in Ni-Al Foils", J. Appl. Phys., 66: 5039 (1989) no month available.
Yamada et al., "Self-Propagating High-Temperature Synthesis of the SiC", J. Mater. Res., 1: 275 (1986) no month available.
Belousov et al., "Some Relationships Governing Initiation of Self-Propagating Synthesis in Direct Electric Heating", Sov. Powd. Met. Powd. Ceram., 10(310): 813 (1989) no month available.
Trofimov et al., "Combustion in Condensed Systems in External Electromagnetic Fields", J. Self-Prop. High-Temp. Synth., 1: 67 (1992) no month available.
Kirdyashkin et al., "Effect of a Magnetic Field on the Combustion of Heterogeneous systems with Condensed Reaction Products", Combust. Explos. Shock Waves, 22: 700 (1986) no month available.
Mishima et al., "Crystal Growth of Cubic Boron Nitride by Temperature Difference Method at ~55 kbar and ~1800° C.", J. Appl. Phys., 61: 2822 (1987) no month availabe.

Primary Examiner—Kathryn Gorgos
Attorney, Agent, or Firm—Robbins, Berliner & Carson

[57] ABSTRACT

A method of combustion synthesis is provided wherein a relatively low field or voltage is applied to a precursor material prior to ignition. The field is at a voltage level effective to energize the material such that a combustion wave is propagated in a controlled manner through the material and without substantial Joule heating prior to ignition of the material, but below voltage levels necessary to initiate combustion. The precursor material, typically comprising a mixture of components which contain stoichiometric amounts of the elements in the desired final product in powder form, is compressed to form a compact having a desired relative density. This compact is subjected to an electric field or voltage at a suitable energy level to achieve the desired energizing of the material. The thus-treated compact is then ignited at a suitable location by, e.g., radiative energy applied from an ignition means. Once ignition occurs, the applied electric field serves to sustain the propagation of the combustion wave in a positive manner.

13 Claims, 11 Drawing Sheets

FIELD-ASSISTED COMBUSTION SYNTHESIS

This invention was made with Government support under NSF Grant No. CTS-9011242 awarded by the National Science Foundation. The Government has certain rights in this invention.

BACKGROUND OF THE INVENTION

The present invention relates to improved methods for the preparation of simple and composite materials by combustion synthesis, as well as to novel phases prepared by the methods of the invention.

Self-propagating high-temperature synthesis (SHS) or combustion synthesis has heretofore been employed for the manufacture of a variety of different materials [Z. A. Munir, "Synthesis of High Temperature Materials by Self-Propagating Combustion Methods," Ceramic Bulletin 67, 342 (1988); Z. A. Munir and U. Anselmi-Tamburini, "Self-Propagating Exothermic Reactions: The Synthesis of High-Temperature Materials by Combustion," Materials Science Reports 3, 277 (1989)]. In the SHS process, the highly exothermic heat of reaction causes the reaction to propagate in the form of a combustion wave through the reactants, converting them into one or more product phases.

Current research in combustion synthesis has for the most part been directed to the synthesis and processing of a variety of simple and complex materials. Such materials include, for example, oxide superconductors, intermetallic compounds, nanoscale particles, composite materials, and functionally gradient materials. Combustion reactions have also been used in conjunction with other processes for preparation of products having desired properties. These include preparation of dense materials through the application of external pressure, application of ceramic and diamond coatings for steel parts, and formation of joints between dissimilar materials.

Theoretical and modeling studies have been directed to investigation of the nature of the combustion wave in self-propagating high-temperature synthesis and the boundaries delineating its stability. Theoretical analyses have also been utilized in experimental studies on the temperature profile of the combustion wave and its significance in the kinetics of these reactions. In recent investigations, the activation energy of the combustion process determined from the temperature profile analysis was in agreement with that calculated from the temperature dependence of the wave velocity, indicating that the reaction is complete within the confines of the wave [S. D. Dunmead et al., "Temperature profile analysis in combustion synthesis: I, Theory and background," J. Am. Ceram. Soc. 75, 175 (1992); S. D. Dunmead et al., "Temperature profile analysis in combustion synthesis: II, Experimental observations," J. Am. Ceram. Soc. 75, 180 (1992)].

The existence and stability of a self-propagating wave are dictated by the thermodynamic and kinetic properties of the combustion reaction. It has been shown empirically that a linear relationship between $\Delta H°_{298}/Cp_{298}$ and $T_{ad}$ exists for a variety of materials (where $\Delta H°_{298}$ is the enthalpy of formation of the product at 298K, $Cp_{298}$ is its heat capacity at 298 K., and $T_{ad}$ is the adiabatic temperature of the combustion reaction). Experimental observations have demonstrated that self-sustaining combustion reactions cannot exist if $T_{ad}$ is less than or equal to about 1800 K.; this corresponds to a minimum ratio of $\Delta H°_{298}/Cp_{298}$ of about 2000 K. Thus, efforts at establishing such reactions in any given marginal system focus on increasing the value of the ratio $\Delta H°/Cp$. For a given reaction, this generally implies increasing $\Delta H°$ by increasing the temperature of the reactants prior to ignition.

Theoretical interest in the existence and mode of propagation of a combustion wave has a counterpart in applied research, as these considerations also influence the nature and/or the microstructure of the product phases. Methods to activate the combustion process, primarily by pre-heating the reactants, have been commonly utilized to cause a self-propagating reaction in less energetic systems. A modification of this approach is the use of a chemical oven [U. Anselmi-Tamburini and Z. A. Munir, "The propagation of solid-state combustion waves in Ni-Al foils," J. Appl. Phys. 66, 5039 (1989)].

Pursuant to heretofore known methods, a mixture of metal and/or nonmetallic precursor powders of a suitable size is formed in an appropriate overall atomic ratio corresponding to that in the desired final product. The powder mixture is then suitably pressed to form a green body (for example, in the form of a pellet) with an appropriate green density (for example, on the order of about 50–60% for, e.g., titanium and carbon).

The green body is then treated to initiate the self-propagating high-temperature synthesis reaction, under either an inert atmosphere or an atmosphere which provides one or more additional elements to be incorporated into the final product (e.g., a nitrogen atmosphere for preparation of nitrides and carbonitrides). The SHS process may suitably be effected inside a combustion chamber. The reaction is typically initiated by imparting energy to one end of the sample; this is suitably carried out by, e.g., transferring sufficient energy to the sample in the form of heat radiated from a tungsten coil. Alternatively, the necessary energy for initiation of the reaction may be supplied by, e.g., a laser. Upon ignition, a self-propagating reaction wave begins to move down the sample. Upon completion of the traversal of the wave in a relatively short period of time (as little as one minute, depending on sample size), the compacted material has been converted to the desired final product.

Methods of combustion synthesis of products from electrically-conductive precursors in which a current is passed through the sample has been reported [see, e.g., O. Yamada et al., "Self-propagating high-temperature synthesis of the SIC," J. Mater. Res. 1, 275 (1986); V. Y. Belousov et al., "Some relationships governing initiation of self-propagating synthesis in direct electric heating," Sov. Powd. Met. Powd. Ceram. 10(310), 813 (1989)]. In reports from one research group, it was suggested that in the case of Ti+C combustion, the ignition temperature is independent of the imposed electric power and seems to coincide with the melting point of titanium [V. A. Knyazik et al., "Macrokinetics of high temperature titanium interaction with carbon under electrothermal explosion conditions," Combust., Explos. Shock Waves 21, 333 (1985); V. A. Knyazik et al., "Mechanism of combustion in the titanium-carbon system," Dokl. Akad. Nauk SSSR 301, 689 (1988)].

In the above studies, it was explicitly or implicitly assumed that the role of the imposed electric field in combustion is thermal in nature (i.e., that the field causes an increase in the temperature of the reactants through Joule heating). Thus, the process would be equivalent to a conventional pre-heating of the reactants (by, e.g., thermal means) prior to ignition. However, a major difference between the two methods relates to the rate of heating. The rate of heating accompanying the passage of a current is significantly higher than that observed through thermal (usually radiative) means. Rapid heating has the advantage that pre-combustion (diffusional) reactions are suppressed, and thus the mechanism of the combustion reaction is not significantly altered before ignition.

Pursuant to the known methods, however, a high level of current is typically employed to cause ignition of the materials. This results in very high expenditures of energy. In addition, the elevated temperatures resulting from the use of high levels of current often result in thermodynamically favoring undesired side-reaction; thus, at these higher temperatures the final product may differ significantly in composition from the desired end product. Another major disadvantage of this approach is that it is restricted to the use of conducting materials as reactants. Non-conducting reactants cannot support a current and would require exceptionally high voltages to initiate a current flow. In most cases, however, the application of high voltages can lead to a dielectric breakdown, a phenomenon associated with electronic excitations.

In the prior studies discussed above, the field was applied through direct contact with electrodes. In a more recent work, the combustion of Ti+C and FeO+Al was studied inside an induction coil [A. I. Trofimov et al., "Combustion in Condensed Systems in External Electromagnetic Fields," Int. J. Self-Prop. High-Temp. Synth. 1, 67 (1992)]. It was reported that combustion of mixtures of Ti, C, Al and FeO at a relative poured density of 0.25 under the influence of high frequency was characterized by a higher velocity and a higher degree of conversion relative to that conducted in the absence of the field. It is further reported, however, that the effect of the field is negligible in the heat-affected zone (i.e., ahead of the wave) and that ignition takes place at the same temperature (1000° C.) in the presence or absence of the field. This is rather puzzling, since the imposition of an induction field would result in an increase in the temperature of a surface layer of the reactant mixture. Thus, a different temperature profile should be obtained when the field is applied.

The influence of a magnetic field on the combustion reaction between condensed phases is even less understood. In the only reported study [A. K. Kirdyashkin et al., "Effect of a magnetic field on the combustion of heterogeneous systems with condensed reaction products," Combust., Explos. Shock Waves 22, 700 (1986)] the application of a magnetic field was seen to increase the velocity of the combustion wave (by nearly a factor of three) in a ferromagnetic metal-sulfur system and in other metal-metal systems in which one metal is ferromagnetic. However, the enhancement of the combustion process by the application of the magnetic field was more complex, showing a dependence on particle size of the metal and on the overall stoichiometry of the reactants. It was proposed that the application of the field increased the effective thermal conductivity of the reactants by increasing the contacts between particles of the ferromagnetic metal through a field-induced rearrangement. There was no correlation between the Curie temperature of the metals used and the field effect. In other words, the combustion temperatures were above or below the corresponding Curie temperature, even when an effect was observed. This is one of the reasons which prompted the suggestion that the field influences the process prior to the arrival of the combustion wave. Thus, according to these observations the effect of the magnetic field is not unique. In other words, if the application of field does nothing more than enhance contact between reacting particles, then other means (e.g., higher compaction pressure, etc.) could equally well be employed to achieve this goal.

It is therefore apparent that the limited experimental observations heretofore reported in the literature do not provide a clear understanding of the role of externally imposed electromagnetic fields on the process of self-propagating combustion syntheses. It has been variously reported that the imposition of electric fields on combustion synthesis substrates enhances the combustion process, retards the combustion rate, or results in a thermally inactivated process in the presence of a liquid phase. In addition, the influence of the field is suggested to be chemical in nature, either by enhancing the combustion reaction through electronic excitations and subsequent collision (in the case of gas-phase combustion), or through thermal activation by Joule heating prior to combustion (in the case of solid-solid combustion). While any one of such explanations may be plausible, there has heretofore been no direct teaching of how to exploit an applied electric field in combustion synthesis processes. In addition, it has apparently been generally accepted that fields are useful only in conducting materials where a current is established. This current is believed to cause heating and subsequently a reaction.

As was pointed out above, on the basis of experimental observations, it has been suggested that systems with $T_{ad}$ less than about 1800 K. will not react in a self-propagating manner, unless the reactants are preheated before ignition. Thus, some materials are difficult to obtain by SHS without preheating. This is especially true for materials that have low adiabatic combustion temperatures, such as SiC, $B_4C$, WC, MoB, $MOB_2$, $TaSi_2$ and composites of x $SiC/MoSi_2$ (x=4–8) and $Al_2O_3/SiC$. However, preheating the reactants before ignition can complicate the combustion process. The long time needed in preheating results in higher energy consumption and the possible formation of undesirable intermediate phases through diffusional reactions.

It is an object of the present invention to provide improved methods of combustion synthesis which do not suffer from the drawbacks of the heretofore known methods.

It is a further object of the present invention to provide methods employing modest conditions to prepare materials which have heretofore been difficult to synthesize (e.g., cubic BN).

SUMMARY OF THE INVENTION

In accordance with the present invention, there is provided a method of combustion synthesis wherein a relatively low field or voltage is applied to a precursor material to be treated prior to ignition. The field is at a voltage level effective to energize the material such that a combustion wave is propagated in a controlled manner through the material and without substantial Joule heating prior to ignition of the material, but below voltage levels necessary to initiate combustion. The precursor material, typically comprising a mixture of components which contain stoichiometric amounts of the elements in the desired final product in powder form, is compressed to form a compact having a desired relative density. This compact is subjected to an electric field or voltage at a suitable energy level to achieve the desired energizing of the material. The thus-treated compact is then ignited at a suitable location by, e.g., radiative energy applied from an ignition means. Once ignition occurs, the applied electric field serves to sustain the propagation of the combustion wave in a positive manner.

Use of the field avoids adverse side-effects resulting from higher temperatures as conventionally employed in the heretofore-known methods for preparation of certain materials. Moreover, the method is generally applicable with a wide range of precursor materials, including in particular precursors in which the components have only a limited capacity or essentially no capacity to conduct electricity; for purposes of the present invention, these components are intended to include materials other than metallic conductors. In addition, the method of the present invention may be employed to synthesize different crystallographic modifications (e.g., formation of cubic BN) or otherwise to modify the course of combustion synthesis in a wide variety of systems, for example, to cause the completion of reactions which otherwise would only be partially completed. This means, for example, that reactions involving relatively large powder particles will go to completion in the presence of the field.

BRIEF DESCRIPTION OF THE DRAWINGS

The invention may be better understood with reference to the accompanying drawings, in which.

DETAILED DESCRIPTION OF THE INVENTION

The present invention is useful in the preparation of compounds (e.g., ceramics), composites (e.g., cermets) and intermetallics (e.g., alloys). In particular, the invention has particular significance in those cases where preheating of the reactants has heretofore been necessary in order to achieve self-propagating high temperature synthesis. Pursuant to the method of the present invention, the complications attendant to preheating of the reactants prior to ignition can be avoided. The present invention finds particular utility in the preparation of materials using significantly more modest processing requirements than heretofore necessary according to known methods (for example, the synthesis of cubic boron nitride).

For example, the synthesis of materials such as $B_4C$ and SiC by the heretofore known methods has required pre-heating of the reactants. If the reactants are initially at room temperature, no reaction takes place. Upon application of a field in accordance with the present invention, however, preparation of the expected phases exhibiting the desired crystallographic modifications is achieved routinely at room temperature.

Similarly, in the absence of a field or voltage applied to the material in accordance with the method of the present invention, no reaction is observed to take place with the ignition source being activated between boron and nitrogen gas at relatively low pressures (e.g., about 10 atm). Upon application of a field as specified herein, however, formation of the cubic modification of boron nitride is routinely achieved. Formation of cubic boron nitride by heretofore known combustion synthesis methods has required both higher temperatures and higher nitrogen pressures relative to the conditions employed in accordance with the present invention. For example, the preparation of cubic BN has been reported as requiring the application of about 55 kbar of pressure at 1800° C. [O. Mishima et al., J. Appl. Phys. 61, 2822 (1987)].

Accordingly, the present invention has utility in a wide variety of combustion synthetic reactions. First of all, it is now possible according to the method of the present invention to prepare materials with a ratio of $\Delta H°_{298}/C_{p298} \leq 2000$ K. by self-propagating synthesis, without pre-heating of the reactants or any other activation process. Thus, the present invention enables the substantially routine preparation of a wide variety of materials which have heretofore not been readily accessible via combustion synthesis, including but not limited to the following: binary compounds, such as SiC, $B_4C$, WC, MoB, $MOB_2$, $TaSi_2$, $Al_4C_3$, $W_2B_5$, WSi, $Mo_3Si$, $MoSi_2$, $NbSi_2$ and most intermetallic compounds (such as, for example, aluminides of nickel, cobalt, copper, iron, molybdenum, niobium, titanium and zirconium, and alloys of titanium with nickel, cobalt and iron); and composites, such as composites of x $SiC/MoSi_2$ (x=4–8) and $Al_2O_3$/SiC. The method is clearly distinguished from other reported methods in that it is not restricted to conducting materials; the passage of a current through the reactants is not a prerequisite to the combustion reaction.

In addition, the inventive method permits the formation of desirable but otherwise difficult to form crystallographic modifications of products wherein the ratio of $\Delta H°_{298}/C_{p298} > 2000$ K. For example, in accordance with the inventive method, it the reactants may be ignited to prepare cubic BN at room temperature and relatively low nitrogen pressure. Similarly, application of a field in accordance with the present invention in other systems may provide a relatively modest manner in which to modify the course of the combustion synthesis reaction, either to provide different product distributions than would be achieved in the absence of a field and/or to reduce the stringency of the processing requirements heretofore considered necessary for formation of a particular product.

Pursuant to the present invention, the first step in the broad method comprises forming a compact of at least one suitable precursor material from which it is desired to prepare a final product by combustion synthesis. A unitary composition may be employed when, for example, the desired final product is a binary compound and the other element may be supplied during the combustion synthesis in a gaseous form (e.g., nitrogen). More typically, binary and ternary mixtures are employed. Both metallic and non-metallic (e.g., carbon, silicon, etc.) precursor materials may both be used in accordance with the present invention, consistent with the composition of the desired final product. In general, the precursor comprises essentially stoichiometric amounts of all elements found in the desired final product.

One type of precursor formulation which has quite general applicability comprises the precursor component(s) in pulverulent form. The precursor materials in powder form suitably have a particle size in the range of about 3 $\mu$m to about 200 $\mu$m, more preferably about 4 $\mu$m to about 50 $\mu$m, and most preferably about 10 $\mu$m to about 15 $\mu$m. As previously noted, both metallic powders and powders of non-metallic elements and compounds are useful in accordance with the present invention.

In accordance with one procedure for formation of a precursor green body, the powder material is suitably compacted or compressed to form a green body having a desired relative density for combustion synthesis. While the relative density of the green body is not absolutely critical and different precursor compositions have different requirements which are readily determined empirically, in general the green body should have a relative density on the order of about 40% to about 70%, more preferably about 45% to about 65%, of theoretical full density. In addition, it should be noted that precursor compacts of a somewhat lower relative density would be more appropriate for combustion synthesis involving gas/solid mixed systems than would be the case for systems in which all components of the final product are provided in solid form; for such materials, the relative density is preferably in the range of about 35% to about 45% of full theoretical density.

Other models of formulating a precursor green body for use in the method of the present invention would also be apparent to those working in the field. For example, the precursor green body may in some cases suitably be prepared by a vapor deposition process. For purposes of illustration, suitable precursor bodies may be prepared for formation of alloys such as NiAl and Ni$_3$Al by using thin layers (e.g., 500–5000 Angstroms) to give the overall stoichiometries. Deposition of these thin layers may be accomplished inside an ultra-high vacuum system (on the order of about $10^{-11}$ torr) by means of electron beam evaporation. The deposited layers may then be combusted on a substrate or in a free-standing form. The velocity is dependent on the thickness of the individual layers, as would be expected from theoretical models. The precursor bodies in this instance are relatively dense materials.

The optimum density for each system is dependent to a great extent upon the thermal conductivity of the green body. In some instances, for example, a precursor having a high density will also conduct heat well. In such a case, heat may be conducted ahead of the combustion wave; as a consequence, the temperature of the material at the wave front may fall below the threshold temperature for combustion synthesis. On the other hand, in some instances better current distributions may be achieved in denser systems. As it is generally not practical from a processing perspective to prepare materials of a higher density than required for particular operating purposes, it is appropriate to determine empirically with any given composition the optimum density within the range broadly specified above for the desired conversion. In addition, in view of an increase in the rate of conversion upon application of the field, it is possible to employ relatively larger particles (e.g., on the order of about 50–200 $\mu$m) in the precursor material than would have heretofore been the case.

Pursuant to the method of the present invention, the green body is subjected to an electric field applied across the sample (e.g., perpendicular or parallel to the direction of travel of the wavefront) and sufficient to promote propagation of the combustion wavefront but not sufficient in and of itself to cause ignition. While not wishing to be bound to any particular theory, it is believed that application of the potential creates a current in the material within a narrow region or localized area substantially coextensive with the combustion wavefront. By applying a relatively low electric field, the effect of the field is substantially limited to the wavefront; this is in contrast to the reported work of Yamada et al. and others, in which the field effects are throughout the entire material. As a consequence, the possibility of significant Joule heating in advance of the wavefront, and the possibility of unwanted side-reactions attendant to pre-heating of the material is substantially reduced. The field may suitably be applied to the precursor green body by applying a potential across the sample between two electrodes of conventional design, for example graphite electrodes.

In practice, it has been determined that potentials on the order of about 2 to about 30 volts are sufficient to achieve the desired enhancement of wave propagation. Determination of an appropriate field strength in any given instance may readily be determined empirically. This is done by determining the minimum (threshold) voltage required to propagate the combustion wave within a relatively short period of time (typically, less than one minute) after the ignition source (e.g., tungsten coil) is activated. It is speculated that this threshold value may be related to the conductivity of the reactants, their green density, and the temperature of the igniter. It is particularly significant that the application of the field in this invention is not restricted to reactants that are conducting. Pursuant to the present invention, the field is not used to ignite the reaction, but rather to activate it.

After application of the electric field perpendicular to the direction of wave propagation, ignition is suitably achieved for example by direct application of radiant energy in the intended direction of wave propagation using an ignition means (such as a tungsten coil). While the enthalpy (heat of formation) $\Delta$ H$_{298}$ for most reactions of interest is negative, in those cases in which the absolute value of $\Delta$ H is not large it has heretofore been difficult using standard techniques either to cause ignition in these systems, or to induce propagation of the combustion wavefront through the system even if ignition is achieved. Application of a potential in accordance with the present invention appears to create a current in a localized area at or near the wavefront, thereby promoting propagation of the wavefront through the material at material temperatures significantly below those heretofore necessary for successful combustion synthesis. In addition, the method of the present invention enables the preparation of products which could not be prepared by conventional combustion synthesis procedures or which could so be prepared only with great difficulty.

As a practical matter, it would of course be advantageous to use the lowest voltage necessary to initiate a self-propagating reaction pursuant to the method of the present invention. Thus, to determine a threshold voltage level in any given system where combustion synthesis would not occur in the absence of pre-heating of the reactants or some other activation treatment, a low initial voltage (on the order of, e.g., about 2 V) is imposed and ignition of the precursor material attempted. If reaction does not take place at the initial voltage level, the voltage is then increased incrementally and the process repeated until ignition is achieved. For purposes of making an empirical determination of this threshold level, it may be desirable to use a new sample for each level of applied voltage. The ignition energy (supplied, e.g., by a standard tungsten ignition coil) required to initiate the reaction is routinely determined empirically, as in the case of the heretofore known combustion synthesis reactions carried out in the absence of an applied field; in general, the same ignition energy and means for applying same is used to initiate the reaction as would be the case in the heretofore known systems.

The invention may be better understood with reference to the accompanying examples, which are intended for purposes of illustration only and should not be construed as in any sense limiting the scope of the invention as defined in the claims appended hereto.

EXAMPLES

Figure 1:
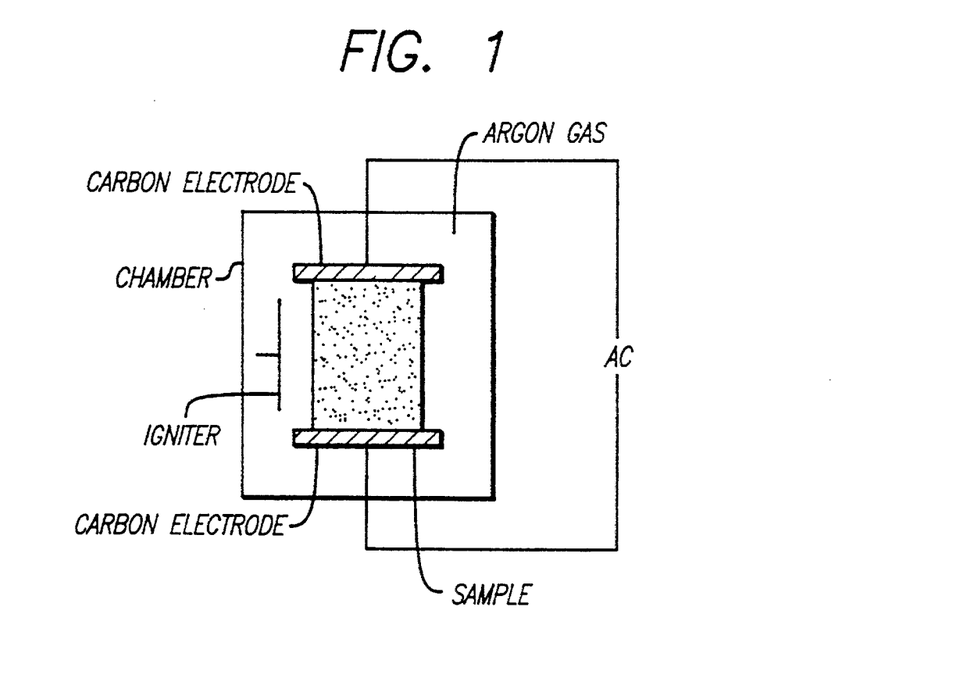
FIG. 1 illustrates a suitable arrangement for carrying out field-assisted combustion synthesis in accordance with the present invention.

Powders were first mixed in a vibratory mixer for 30 minutes and the mixtures pressed into cylindrical pellets with typical dimensions of 6.33 mm diameter and 14 mm height. The relative density of the samples (unless otherwise indicated) was on the order of about 55%. A sample was placed between two carbon electrodes and an igniter (a tungsten ignition coil of conventional design) placed near the side of the sample (FIG. 1). The distance between the sample and the igniter was maintained at 2 mm. The combustion chamber was filled with argon gas at 1 atmosphere pressure for systems in which all reactants were solids; for gas-solid reactions (such as formation of BN), a nitrogen atmosphere at a modest pressure (e.g., 10 atm) was required. The applied voltage was in the range of 2 to 30 V.

The electric field was first applied to the sample, followed by activation of the tungsten ignition coil. When wave propagation occurred, the igniter was turned off. The electric field was terminated when the combustion wave had propagated through the entire sample. The whole process of combustion synthesis was recorded on a Sony Betamax video-recorder with a time-code generator. Combustion temperatures were measured by a two-color pyrometer and by a thermocouple. The voltage and current were recorded simultaneously. All products were analyzed by X-ray diffraction to determine the nature of the resulting phases; in all cases, the products were found to be almost 100% pure by X-ray analysis.

Example 1

A stoichiometric mixture of one part molybdenum in powder form, 4–8 μm in particle size, and two parts boron in powder form, −325 mesh, was formulated into a cylindrical pellet as described above. Following application of a voltage of 8 V, the material was ignited. After a reaction time of 10.8 seconds, propagation of the wave was complete; application of the voltage was then terminated. The product was a mixture of roughly 50% $MoB_2$ and 50% of $Mo_2B_5$.

Figure 2:
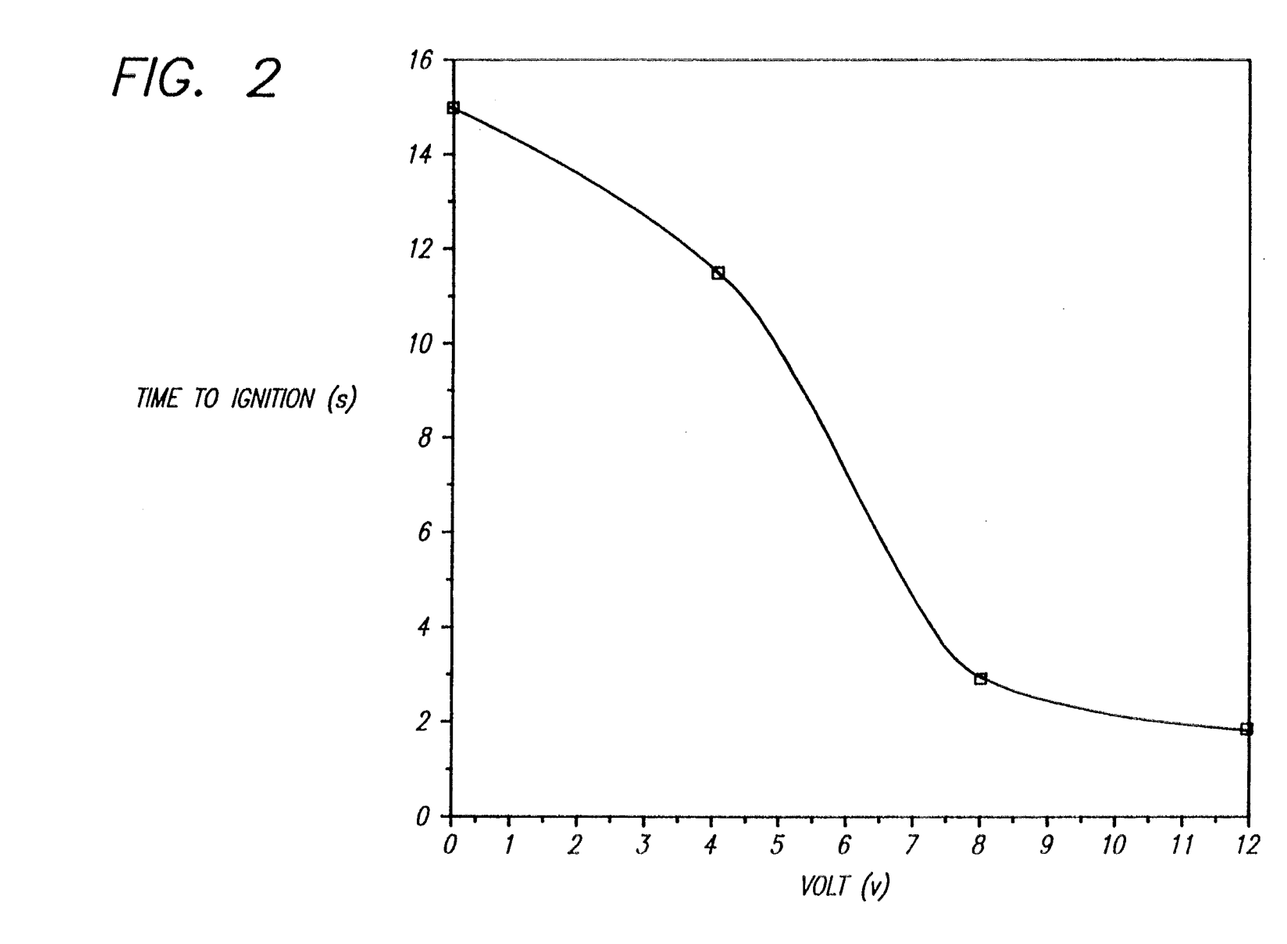
FIG. 2 illustrates the relationship between the applied voltage and ignition time in the MoB system.
Figure 3:
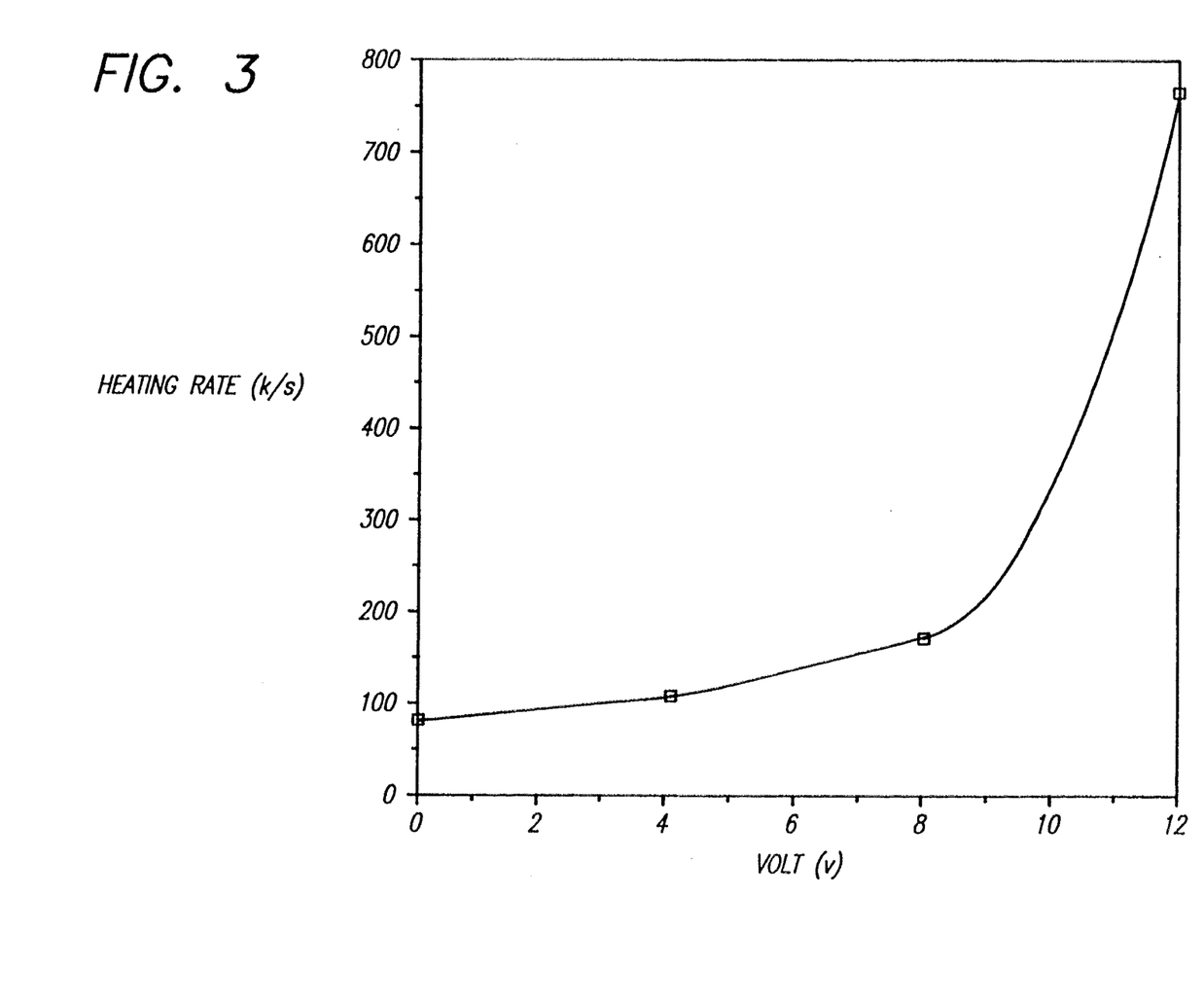
FIG. 3 illustrates the relationship between the applied voltage and heating rate in the MoB system.

In an effort to understand the effect of the electric field in the combustion synthesis process, different voltages were applied using the Mo-B system. The relationship of voltage with time to ignition and heating rate is illustrated in FIGS. 2 and 3, respectively. The time to ignition is defined as the period of time that the sample was heated by the tungsten coil before ignition occurred; the heating rate is defined as the rate of temperature increase in the sample before ignition. These results indicate that as the voltage is increased, the time to ignition decreased while the heating rate increased in the Mo-B system.

Figure 4:
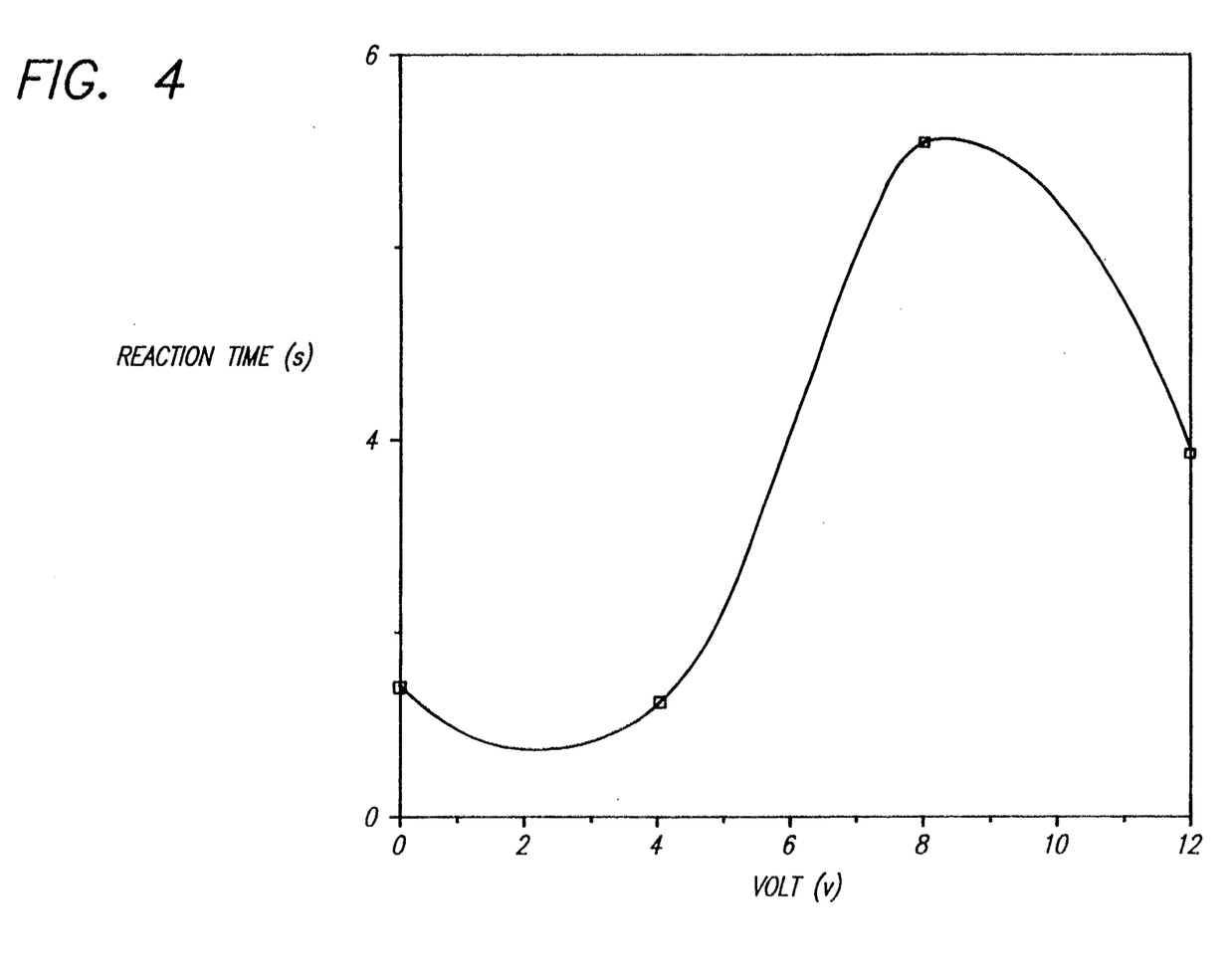
FIG. 4 illustrates the relationship between the applied voltage and reaction time in the MoB system.
Figure 5:
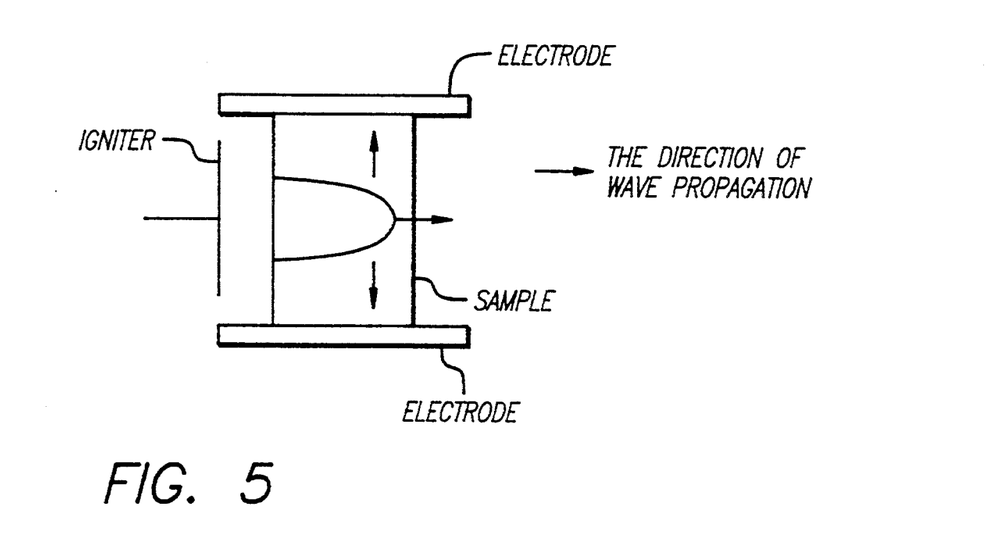
FIG. 5 illustrates in schematic form the modes of wave propagation upon application of a low voltage (<8 V)

As shown in FIG. 4, the reaction time (defined as the time it takes for the combustion wave to propagate through the whole sample) varied with voltage. While not wishing to be bound by any particular theory, it is speculated that this behavior reflects different modes of wave propagation. With the application of a low voltage ($U<4$ V), the combustion wave propagates in two modes. Initially, the combustion wave propagates along the middle portion of the sample. Then, the wave begins to move to the top and bottom of the sample, as shown schematically in FIG. 5. With the application of a low voltage, the sample requires a longer heating time before ignition.

Figure 6A:
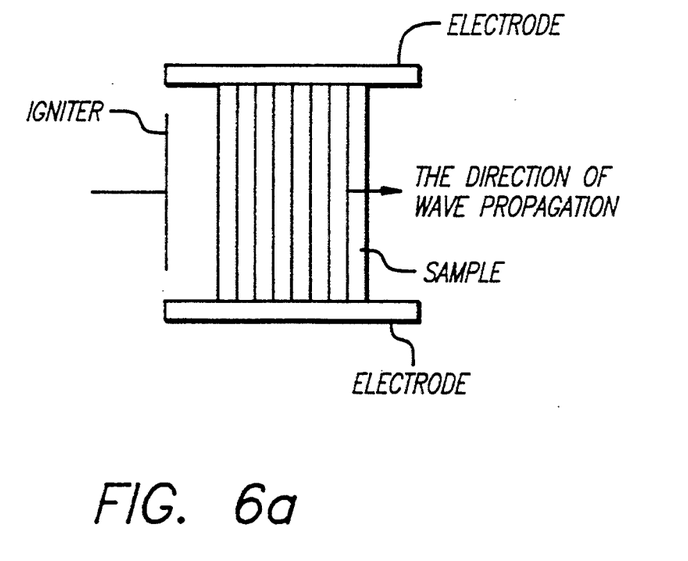
FIGS. 6(A) and 6(b) depict the propagation of the combustion wave and the nature of wave propagation upon application of a high voltage.
Figure 6B:
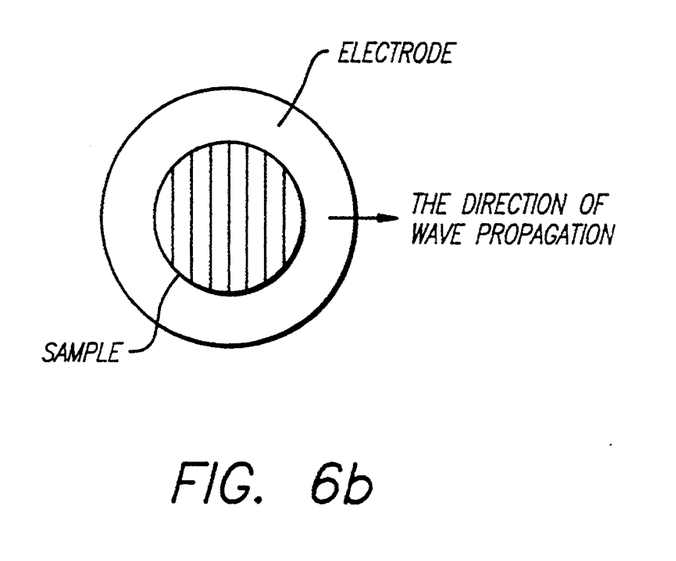
Figure 7:
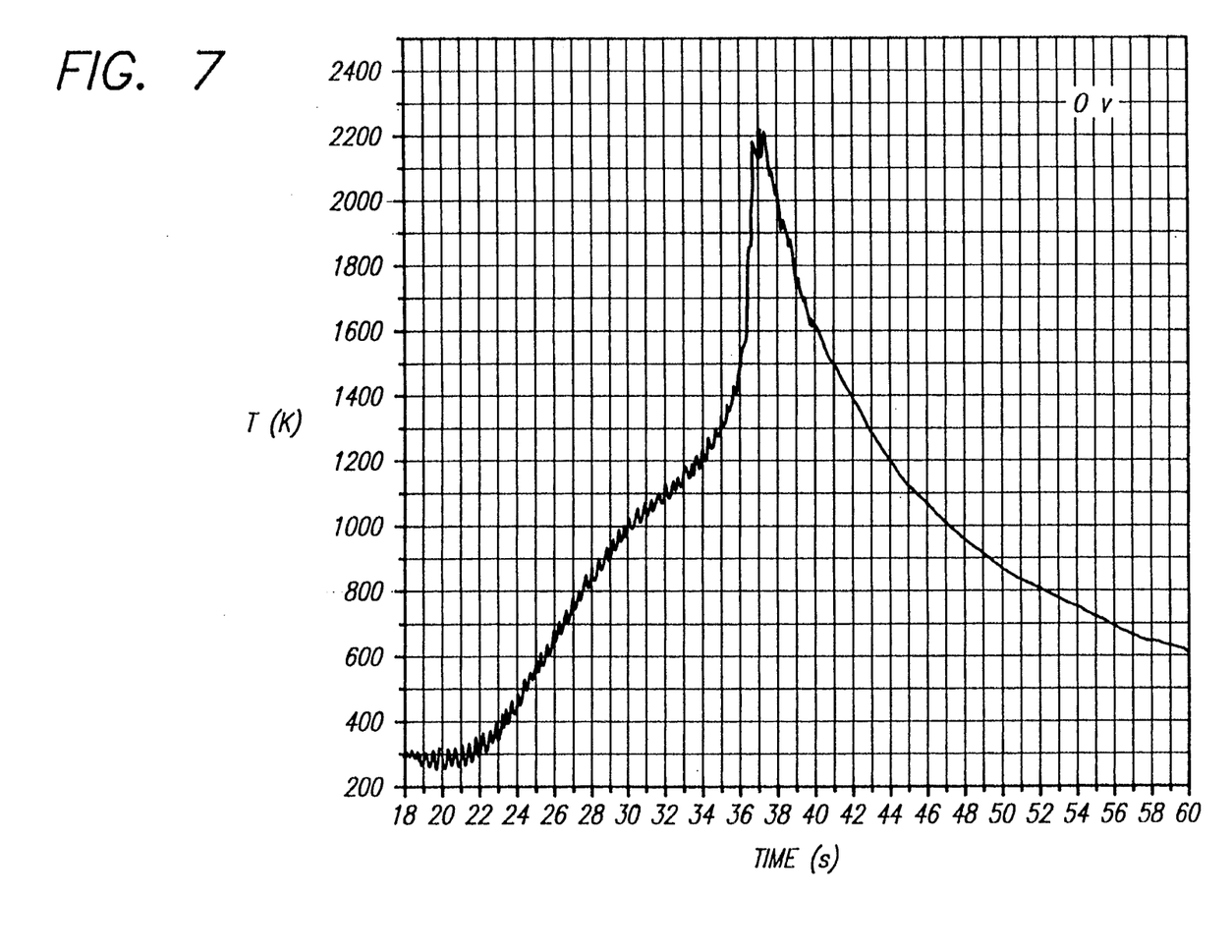
FIGS. 7 through 10 illustrate the temperature profiles for synthesis of MoB at different applied voltages.
Figure 8:
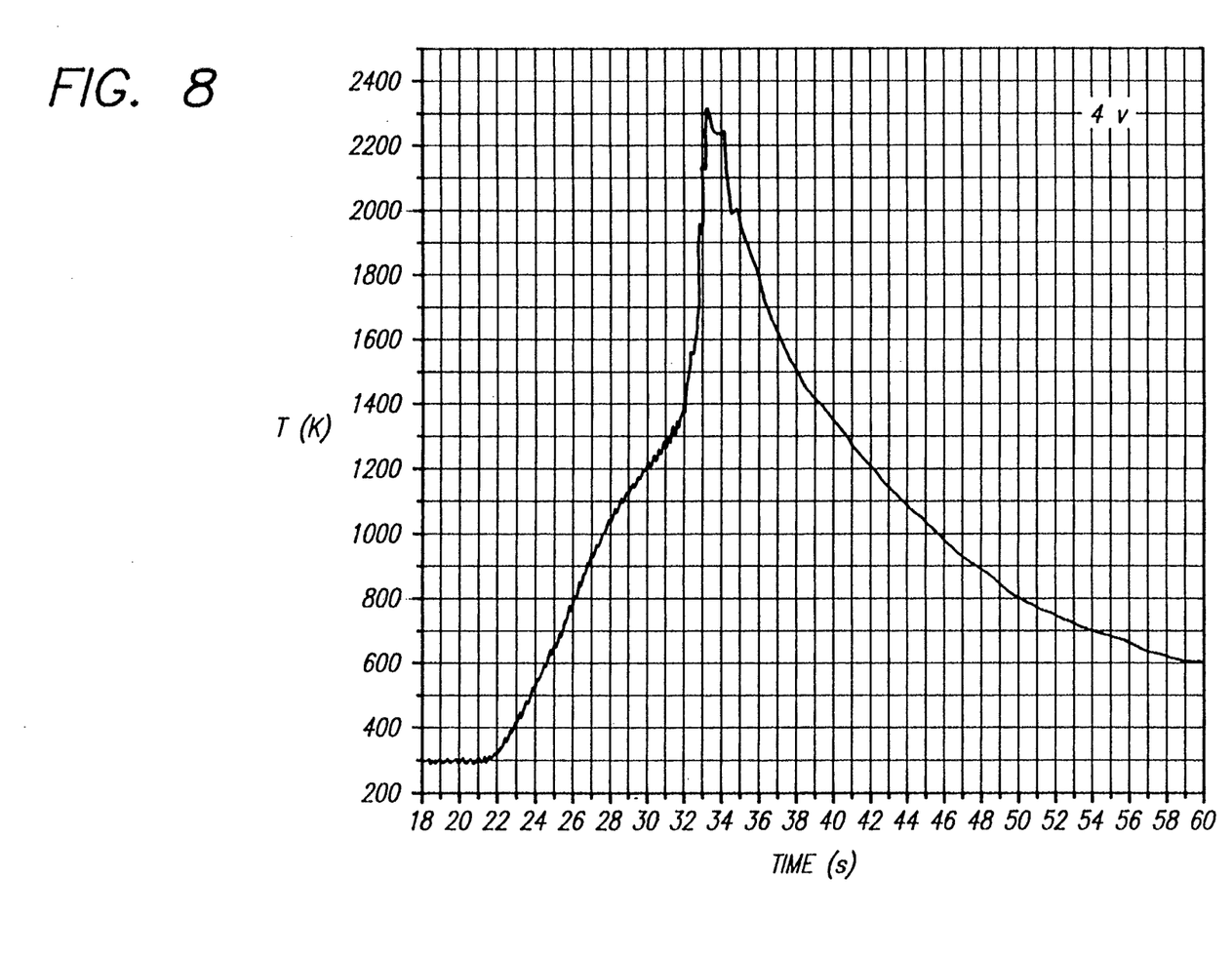
Figure 9:
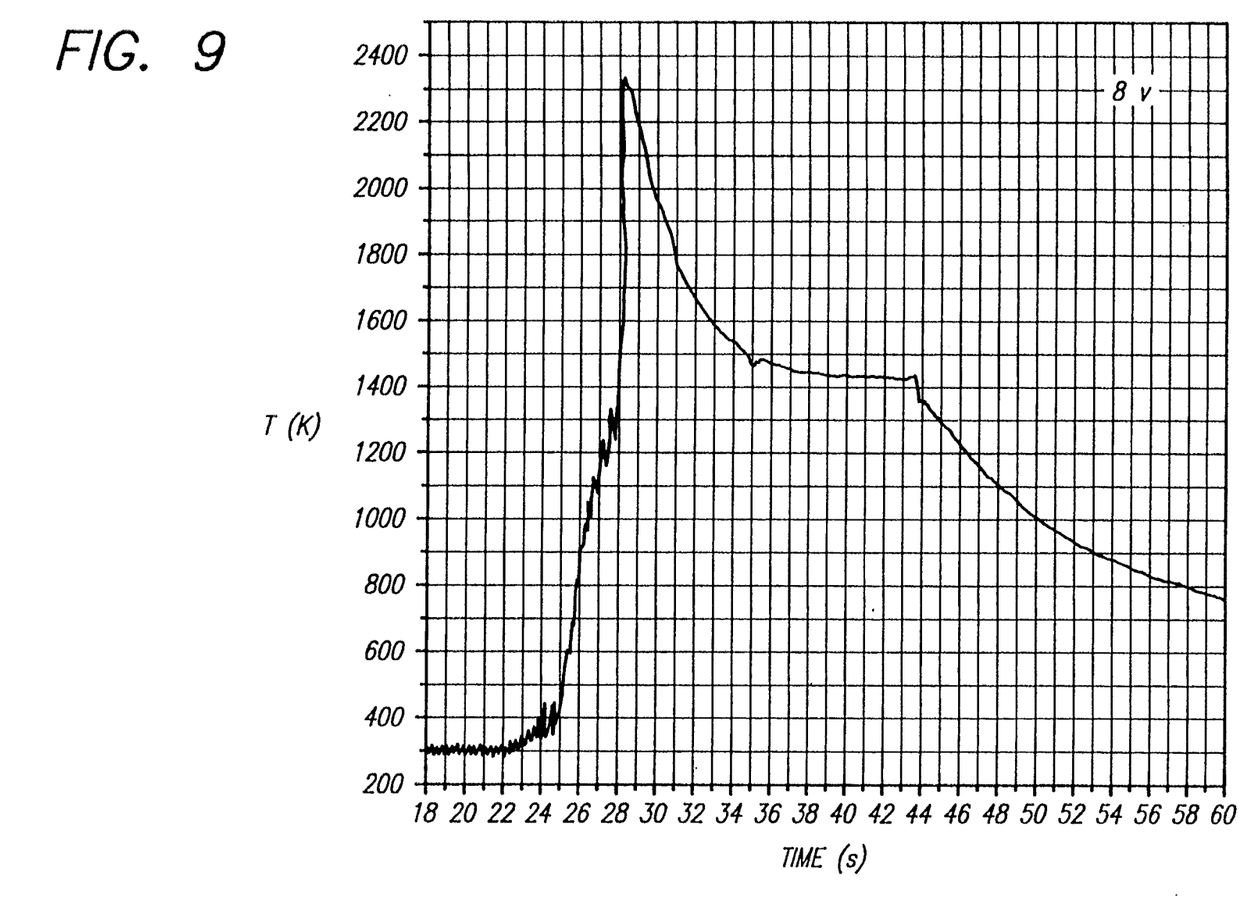
Figure 10:
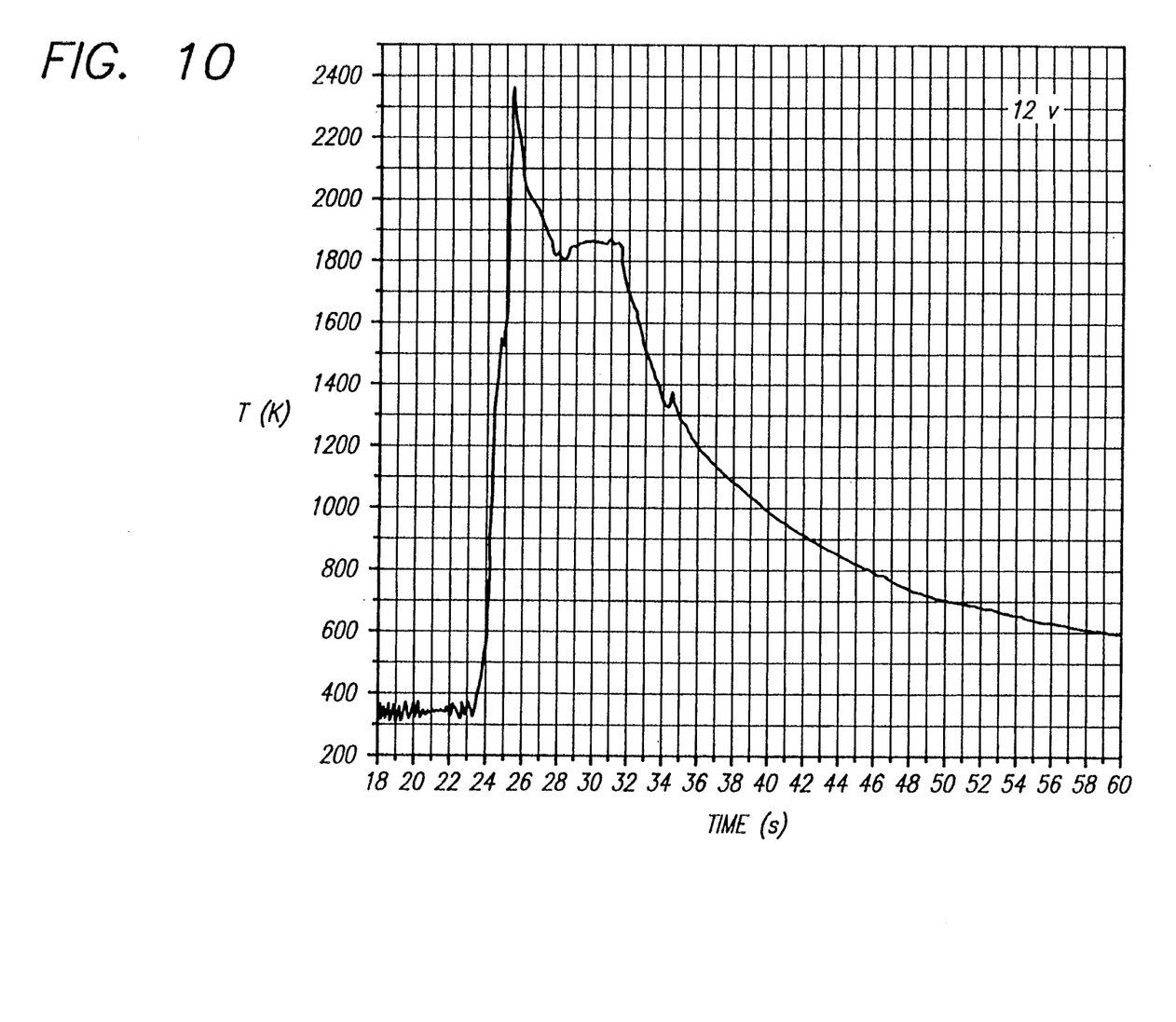

When the voltage was increased ($U \geq 8$ V), the direction of the combustion wave was in the expected axis, i.e., perpendicular to the plane of the ignition coil (as depicted in FIG. 6(A). In this process, the sample may be considered to comprise a composite of layers. FIG. 6(B) illustrates schematically the nature of the wave propagation, wherein each layer serves to ignite the next. Temperature profiles for synthesis of MoB at different applied voltages are shown in FIGS. 7 through 10. Interestingly, the ignition temperature (the point at which the temperature rises abruptly) appears to be independent of the applied voltage, occurring at about 1400 K. in this system.

Figure 11:
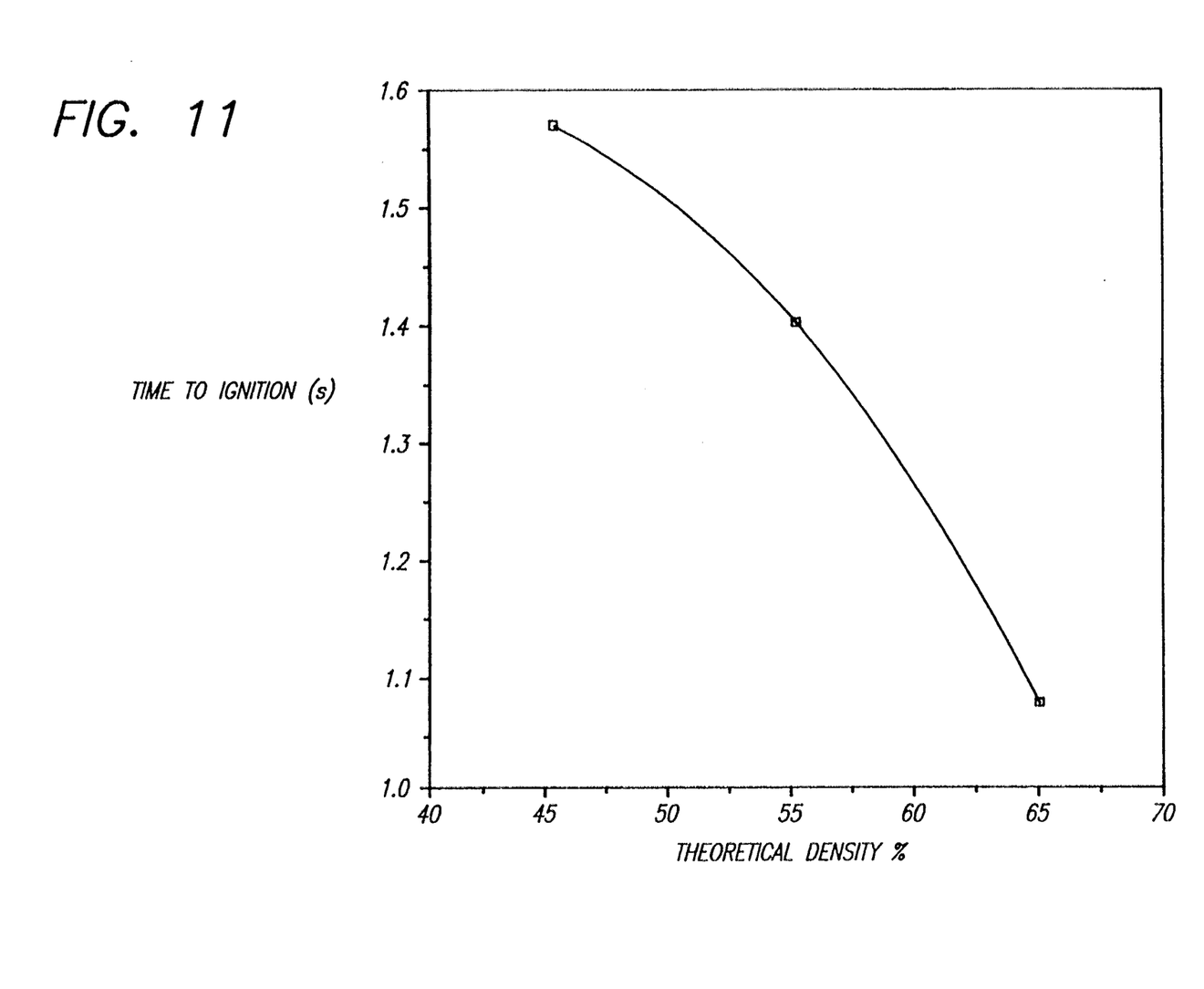
FIG. 11 illustrates the relationship between green density and ignition time in the system Mo+B.
Figure 12:
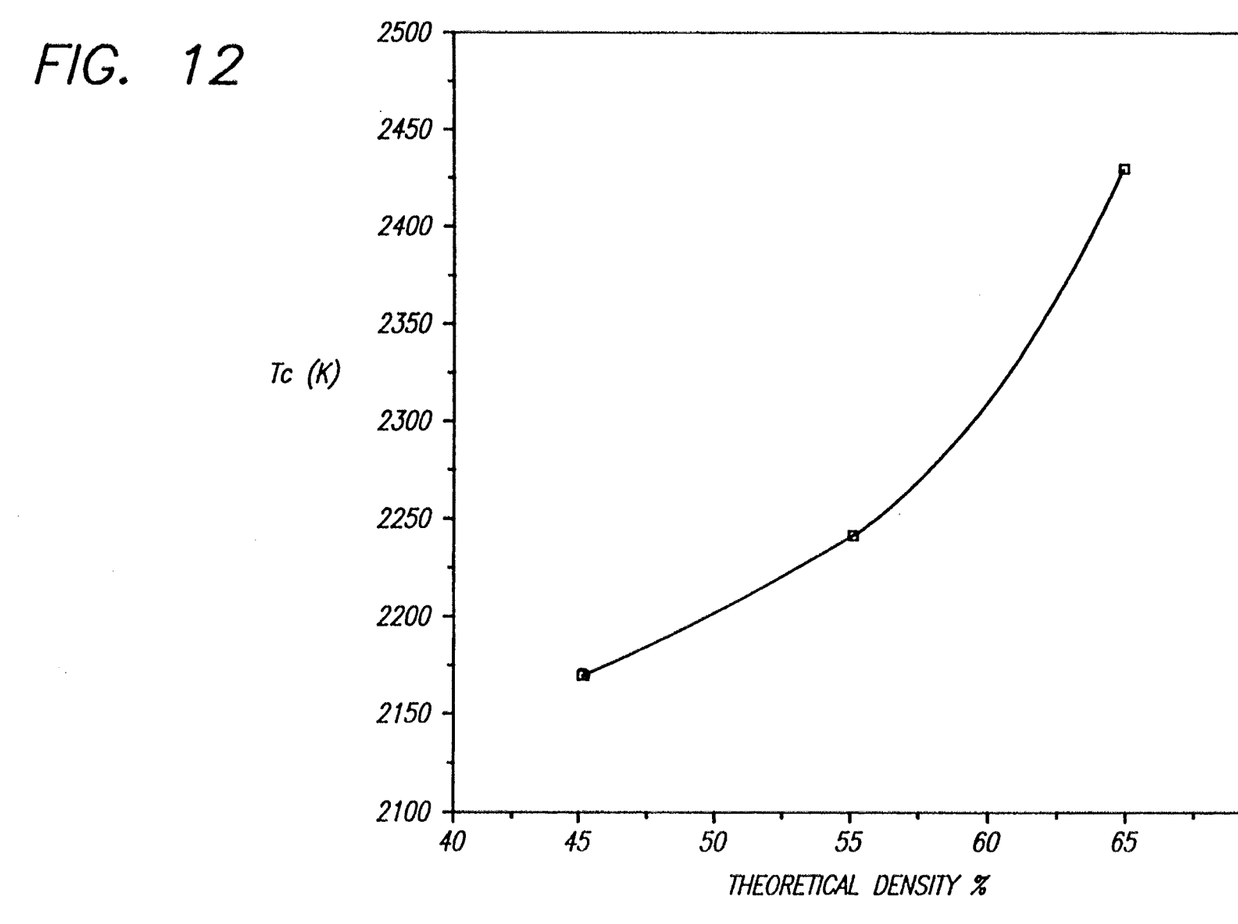
FIG. 12 illustrates the relationship between combustion temperature and green density in the system Mo+B.

In addition, the role of green density in the phenomenon of field-assisted combustion has been explored. It has been shown that the time to ignition decreased when the green density increased (FIG. 11). For example, the time to ignition in the system Mo+B is about 1.57 seconds when the green density is 45%, but the time decreased to 1.08 seconds when the density is increased to 65% for the reaction Mo+B=MoB at an applied voltage of 10 V. There is also an observed increase in the combustion temperature $T_c$ as the green density is increased for the same reaction system and with the same field strength (FIG. 12). Thus, $T_c$ increased from about 2170 to 2450 K. as the density changes from 45 to 65%.

Example 2

A stoichiometric mixture of Si in powder form, −325 mesh and carbon (graphite, 6 μm) was formulated into a cylindrical pellet as described above. Following application of a voltage of 12 V, the material was ignited. After a reaction time of 4.4 seconds, propagation of the wave was complete; application of the voltage was then terminated. The product was β-SiC.

Example 3

A stoichiometric mixture of four parts B (−325 mesh crystalline powder) and one part carbon (graphite, about 6 μm) was formulated into a cylindrical pellet as described above. Following application of a voltage of 12 V, the material was ignited. After a reaction time of 16.4 seconds, propagation of the wave was complete; application of the voltage was then terminated. The product was predominantly $B_4C$; a trace amount of residual carbon was present in the final product.

Example 4

A stoichiometric mixture of Mo (powder, 4–8 μm) and boron (−325 mesh crystalline powder) was formulated into a cylindrical pellet as described above. Following application of a voltage of 8 V, the material was ignited. After a reaction time of 2.9 seconds, propagation of the wave was complete; application of the voltage was then terminated. The product was a mixture of 60% α-MoB and 40% β-MoB.

Example 5

A stoichiometric mixture of tungsten (powder, approximately 12 μm) and carbon (graphite, 6 μm) was formulated into a cylindrical pellet as described above. Following application of a voltage of 10.5 V, the material was ignited. After a reaction time of 29.5 seconds, propagation of the wave was complete; application of the voltage was then terminated. The product was primarily WC; a trace amount of $W_2C$ was also present in the final product.

Example 6

A stoichiometric mixture of six parts Si (powder, −325 mesh), 4 parts carbon (graphite, approximately 6 μm) and 1 part molybdenum (powder, 4–8 μm) was formulated into a cylindrical pellet as described above. Following application of a voltage of 12 V, the material was ignited. After a reaction time of 10.5 seconds, propagation of the wave was complete; application of the voltage was then terminated. The product was the expected stoichiometric mixture of one part $MoSi_2$ and four parts SiC in the form of a composite.

Example 7

Boron (crystalline, −325 mesh) was formulated into a cylindrical pellet as described above. Reaction with nitrogen was carried out under an atmosphere of nitrogen of high purity at a pressure of about 10 atmospheres. Following application of a voltage of 24 V, the material was ignited. After a reaction time of 18.1 seconds, propagation of the wave was complete; application of the voltage was then terminated. The reaction product was cubic BN containing about 50% residual B; the unreacted boron could be easily separated from the reaction product.

Example 8

A stoichiometric mixture of four parts aluminum (powder, −325 mesh), 3 parts silicon dioxide (powder, −325 mesh) and three parts carbon (graphite, approximately 6 μm) was formulated into a cylindrical pellet as described above. Following application of a voltage of 12–29 V, the material was ignited. After a reaction time of 27.3 seconds, propagation of the wave was complete; application of the voltage was then terminated. The product was the expected stoichiometric mixture of $Al_2O_3$ and SiC in the form of a composite, with trace amounts of silicon and aluminum.

While there have been shown and described the fundamental novel features of the invention, it will be understood that various omissions, substitutions and changes in the form and details illustrated may be made by those skilled in the art without departing from the spirit of the invention. It is the intention, therefore, to be limited only as indicated by the scope of the following claims.

What is claimed is:

1. A method for preparing a product by self-propagating synthesis, wherein a precursor containing essentially stoichiometric amounts of elements comprising the product is ignited at a first end thereof to initiate conversion of the precursor to the product by a combustion wavefront which traverses the precursor from the first end to a second opposite end thereof, said method comprising:

subjecting the precursor to an electric field applied across the precursor, said field promoting propagation of the combustion wavefront through the precursor but not sufficient to induce substantial Joule heating prior to ignition of the precursor or to cause ignition of the precursor; and igniting the precursor to initiate combustion while maintaining the electric field, thereby promoting propagation of the combustion wavefront from the first end to the second end.

2. A method according to claim 1, wherein the precursor has a relative density of about 45% to about 70% of full theoretical density.

3. A method according to claim 1, wherein said igniting step is carried out in a gaseous source of at least one element comprising the product.

4. A method according to claim 3, wherein the precursor has a relative density of about 35% to about 45% of full theoretical density.

5. A method according to claim 1, wherein the product has a ratio of $\Delta H°_{298}/Cp_{298} \leq 2000$ K., in which $\Delta H°_{298}$ is enthalpy of formation of the product at 298 K. and $Cp_{298}$ is heat capacity of the product at 298 K.

6. A method according to claim 1, wherein the product has a ratio of $\Delta H°_{298}/Cp_{298} \leq 2000$ K.

7. A method according to claim 1, wherein the product is selected from the group consisting of SiC, $B_4C$, WC, MoB, $MoB_2$, $TaSi_2$, $Al_4C_3$, $W_2B_5$, WSi, $Mo_3Si$, $MoSi_2$ and $NbSi_2$.

8. A method according to claim 1, wherein the product is selected from the group consisting of intermetallic compounds.

9. A method according to claim 1, wherein the product is cubic boron nitride.

10. A method according to claim 9, wherein the boron nitride is prepared from a boron precursor under a nitrogen pressure of about 10 atmospheres.

11. A method according to claim 1, wherein the precursor comprises a compact of particles having a particle size in the range of about 3 μm to about 200 μm.

12. A method according to claim 11, wherein the particle size is in the range of about 4 μm to about 50 μm.

13. A method according to claim 1, wherein the precursor has substantially no capacity to conduct electricity.

* * * * *

UNITED STATES PATENT AND TRADEMARK OFFICE
CERTIFICATE OF CORRECTION

PATENT NO. : 5,380,409
DATED : January 10, 1995
INVENTOR(S) : Zuhair A. R. Munir; Weinong Lai; Karl H. Ewald It is certified that error appears in the above-identified patent and that said Letters Patent is hereby corrected as shown below:

| Column | Line | |
|--------|------|---|
| 4 | 38 | Delete "MOB$_2$," and insert --MoB$_2$-- |
| 6 | 38 | Delete "MOB$_2$," and insert --MoB$_2$-- |
| 7 | 39 | Delete "models" and insert --methods-- |
| 12 | 47 | Delete "MOB$_2$," and insert --MoB$_2$-- |

Signed and Sealed this

Twenty-first Day of March, 1995

Attest:

BRUCE LEHMAN

Attesting Officer          Commissioner of Patents and Trademarks